United States Patent
Zhang et al.

(10) Patent No.: US 12,510,484 B1
(45) Date of Patent: Dec. 30, 2025

(54) PREPARATION METHOD AND USE OF METAL-ORGANIC FRAMEWORKS (MOFs)-BASED COMPOSITE PRETREATMENT MATERIAL FOR ELIMINATING CAPSAICIN (CAP) INTERFERENCE

(71) Applicant: Jiangsu University, Jiangsu (CN)

(72) Inventors: Di Zhang, Jiangsu (CN); Yushan Fan, Jiangsu (CN); Xiaoxia Sun, Jiangsu (CN); Xiaobo Zou, Jiangsu (CN); Bolin Shi, Beijing (CN); Maurizio Battino, Jiangsu (CN); Jiyong Shi, Jiangsu (CN); Lingqin Shen, Jiangsu (CN); Xinai Zhang, Jiangsu (CN); Xiaoou Wei, Jiangsu (CN); Bo Zhao, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/879,232

(22) PCT Filed: Mar. 9, 2023

(86) PCT No.: PCT/CN2023/080539
§ 371 (c)(1),
(2) Date: Dec. 26, 2024

(87) PCT Pub. No.: WO2024/001287
PCT Pub. Date: Jan. 4, 2024

(30) Foreign Application Priority Data

Jun. 29, 2022 (CN) .......................... 202210750180.X

(51) Int. Cl.
| | |
|---|---|
| *G01N 21/65* | (2006.01) |
| *A23L 23/00* | (2016.01) |
| *C07F 1/08* | (2006.01) |
| *C07F 3/06* | (2006.01) |
| *G01N 33/02* | (2006.01) |

(52) U.S. Cl.
CPC ............ *G01N 21/658* (2013.01); *A23L 23/00* (2016.08); *C07F 1/08* (2013.01); *C07F 3/06* (2013.01); *G01N 33/02* (2013.01)

(58) Field of Classification Search
CPC ...... G01N 21/658; G01N 33/02; A23L 23/00; C07F 1/08; C07F 3/06
(Continued)

(56) References Cited

U.S. PATENT DOCUMENTS

| | | | |
|---|---|---|---|
| 2017/0306301 A1* | 10/2017 | Martin | ....................... C12P 7/24 |
| 2021/0139348 A1 | 5/2021 | Awadh | |
| 2021/0277029 A1* | 9/2021 | Li | ........................... B01J 20/226 |

FOREIGN PATENT DOCUMENTS

| | | |
|---|---|---|
| CN | 105566660 | 5/2016 |
| CN | 110711405 | 1/2020 |

(Continued)

OTHER PUBLICATIONS

Gao Yuhang et al., "Application of Magnetic Metal-Organic Framework Composites in Food Quality Safety and Inspection", Food Science and Technology, Apr. 2020, submit with English abstract, pp. 324-331.
(Continued)

*Primary Examiner* — Md M Rahman
(74) *Attorney, Agent, or Firm* — JCIPRNET

(57) ABSTRACT

The present disclosure belongs to the technical field of rapid detection of foods, and relates to a preparation method and use of a metal-organic frameworks (MOFs)-based composite pretreatment material for eliminating capsaicin (CAP) interference. First, preparing an metal-organic frameworks suspension; adding ammonia water to an iron salt solution, centrifuging, washing, drying and redispersion to obtain a magnetic nanoparticle suspension; mixing with the metal-organic frameworks suspension and heating, centrifuging,
(Continued)

washing, drying and redispersion to obtain a magnetic material-modified metal-organic frameworks solution; adding an amidated polysulfone solution, preparing the resulting mixed solution into a droplet, and solidifying the droplet in water to obtain the MOFs-based composite pretreatment material. The MOFs-based composite pretreatment material can be used in capsaicin interference-resistant detection of a numbing substance in a spicy hot pot soup base.

10 Claims, 2 Drawing Sheets

(58) Field of Classification Search
USPC .......................................................... 356/301
See application file for complete search history.

(56) References Cited

FOREIGN PATENT DOCUMENTS

| CN | 111220592 | 6/2020 |
|----|-----------|--------|
| CN | 112540072 | 3/2021 |
| CN | 114409913 | 4/2022 |
| CN | 115078330 | 9/2022 |

OTHER PUBLICATIONS

Jiangbo Huo et al., "The fabrication of magnetic metal-organic frameworks composites and their application in environment", Scientia Sinica Chimica, Apr. 2017, submit with English abstract, pp. 830-843.

Linnan Li et al., "Recent advances in applications of metal-organic frameworks for sample preparation in pharmaceutical analysis", Coordination Chemistry Reviews, Feb. 2020, pp. 1-15.

"International Search Report (Form PCT/ISA/210) of PCT/CN2023/080539," mailed on May 25, 2023, with English translation thereof, pp. 1-6.

"Written Opinion of the International Searching Authority (Form PCT/ISA/237) of PCT/CN2023/080539," mailed on May 25, 2023, pp. 1-5.

* cited by examiner

PREPARATION METHOD AND USE OF METAL-ORGANIC FRAMEWORKS (MOFs)-BASED COMPOSITE PRETREATMENT MATERIAL FOR ELIMINATING CAPSAICIN (CAP) INTERFERENCE

CROSS-REFERENCE TO RELATED APPLICATION

This application is a 371 of international application of PCT application serial no. PCT/CN2023/080539, filed on Mar. 9, 2023, which claims the priority benefit of China application no. 202210750180.X, filed on Jun. 29, 2022. The entirety of each of the above-mentioned patent applications is hereby incorporated by reference herein and made a part of this specification.

TECHNICAL FIELD

The present disclosure relates to the technical field of rapid detection of foods, and specifically to a preparation method and use of a metal-organic frameworks (MOFs)-based composite pretreatment material for eliminating capsaicin (CAP) interference.

BACKGROUND OF RELATED ART

Sichuan hot pot is famous for its spicy flavor and is loved by consumers. Hydroxy-α-sanshool (α-SOH) is the most important representative ingredient for producing a numbing flavor, and an α-SOH content is an important index for measuring a flavor quality of a spicy hot pot soup base and plays a key role in the flavor regulation and standardized production of a spicy hot pot soup base. Therefore, it is essential to enable the rapid quantitative detection of α-SOH in a spicy hot pot soup base.

A common method for detecting a numbing substance is high-performance liquid chromatography (HPLC), but HPLC involves complicated operating procedures and cannot enable the portable rapid detection. It is proposed in a patent (CN202010112255.2) that Raman spectroscopy can be used to rapidly detect a numbing substance in a Huajiao extract. However, a focus of detection of a numbing substance in a spicy hot pot soup base by Raman spectroscopy is that Raman characteristic peaks of CAP and α-SOH are heavily overlapped, which makes it impossible to achieve the accurate quantification of α-SOH. In addition, although it is currently proposed in a patent (CN202011314447.8) that a spicy hot pot soup base can be treated with polyphenol oxidase (PPO) to eliminate the interference of CAP for a Raman signal of α-SOH, the natural enzyme has a short preservation period and an activity of the natural enzyme is greatly affected by a source and detection environment (temperature, pH, or the like) of the natural enzyme, which limits the application of the above method. Therefore, it is necessary to develop a method for stably eliminating the interference of CAP in a spicy hot pot soup base to achieve the detection of α-SOH by Raman spectroscopy.

SUMMARY OF THE INVENTION

The present disclosure is intended to provide an MOFs-based composite material for eliminating interference of CAP to a Raman signal of α-SOH, and to establish a surface-enhanced Raman spectroscopy (SERS) method that enables the rapid qualitative and quantitative detection of α-SOH in a spicy hot pot soup base accordingly.

In order to achieve the above objective, the present disclosure adopts the following technical solution: a sample (hot pot soup base) to be detected is treated by an MOFs magnetically coated with amidated polysulfone (PIPSF), then a resulting solid is adsorbed and separated by a magnet, the remaining sample is mixed with an SERS substrate, and a Raman spectral signal is acquired to achieve the quantitative detection of α-SOH in the spicy hot pot soup base.

The present disclosure provides a preparation method of an MOFs-based composite pretreatment material for eliminating CAP interference in a quantitative detection of α-SOH in a spicy hot pot soup base through Raman spectroscopy, specifically including the following steps:

(1) preparing an MOFs material: adding the MOFs material to methanol·ultrasonically washing the MOFs material, and collecting a resulting solid material through centrifugation, drying the resulting solid material to obtain a dried solid material, and dispersing the dried solid material in methanol to obtain an MOFs suspension, which is denoted as a suspension A;

(2) dissolving an iron salt in deoxygenated pure water, and stirring to obtain an iron salt solution; adding ammonia water dropwise to the iron salt solution, and further stirring to obtain a dispersion; and centrifuging the dispersion to obtain a precipitate, washing the precipitate to obtain a washed precipitate, separating the washed precipitate through centrifugation, and dispersing the washed precipitate in water to obtain a magnetic nanoparticle suspension, which is denoted as a suspension B;

(3) adding the suspension A to the suspension B, and heating a resulting mixed solution to obtain a solid suspension; centrifuging the solid suspension, ultrasonically washing a resulting precipitate, and collecting a product; and drying the product to obtain a dried product, and dispersing the dried product in N,N-dimethylformamide (DMF) to obtain a magnetic material-modified MOFs suspension, which is denoted as a suspension C; and (4) dissolving PIPSF in DMF to obtain a PIPSF solution; adding the suspension C to the PIPSF solution, and stirring at room temperature to obtain an MOFs-based composite material stock solution; and generating a droplet from the MOFs-based composite material stock solution by a spray gun device, solidifying and precipitating the droplet in water, and filtering to obtain a spheroid precipitate, which is the MOFs-based composite pretreatment material.

Further, in the step (1), the MOFs material is one or a mixture of two or more selected from the group consisting of HKUST-1. ZIF-67, ZIF-8. Fe-BTC, and MIL-101 (Fe); the MOFs material has a particle size of 0.1 μm to 5 μm; and
  the ultrasonic washing is conducted for 1 min to 3 min; the centrifugation is conducted at 3,000 rpm/min to 8.000 rpm/min for 5 min to 10 min; the drying is conducted at 30° C. to 60° C. for 6 h to 12 h; and the suspension A has a concentration of 0.1 mg/mL to 10 mg/mL.

Further, in the step (2), the iron salt is one or a mixture of two selected from the group consisting of ferrous chloride tetrahydrate and ferric chloride hexahydrate; the ammonia water has a concentration of 20% to 30%; and the iron salt, the deoxygenated pure water, the ammonia water, and the water are used in a ratio of (1-2) g:(40-50) mL:(5-10) mL:(40-50) mL.

Further, in the step (2), the stirring to obtain the iron salt solution is conducted at 35° C.; the further stirring to obtain the dispersion is conducted for 2 h to 3 h; the centrifugation is each conducted at 15,000 rpm/min for 10 min to 30 min; the washing is conducted as follows: adding the precipitate to water, and washing; the suspension B has a concentration of 10 mg/mL to 30 mg/mL; and a dispersing medium of the suspension B is ferroferric oxide ($Fe_3O_4$).

Further, in the step (3), a volume ratio of the suspension A to the suspension B is (30-40) mL:(10-20) mL; the suspension C has a concentration of 10 mg/mL to 20 mg/mL; and the heating is conducted at 50° C. to 100° C. for 10 h to 20 h; the centrifugation is conducted at 3,000 r/min to 6,000 r/min for 10 min to 15 min; the ultrasonic washing is conducted as follows: adding the precipitate obtained after the centrifugation to water, and ultrasonically washing; and the drying is conducted at 25° C. for 24 h.

Further, in the step (4), a ratio of the PIPSF to the DMF is (10-20) g:100 mL; a volume ratio of the PIPSF solution to the suspension C is (1-5):(1-10); the stirring at room temperature is conducted for 12 h to 24 h; the generating the droplet from the MOFs-based composite material stock solution is conducted as follows: generating the droplet specifically by a semi-continuous spray gun device with a nozzle size of 800 μm; and the spheroid precipitate is filtered out by a 5 μm nylon filter.

Further, in the step (4), the PIPSF is synthesized specifically through the following steps: dissolving 20 g of polysulfone (PSF) in 200 mL of dichloromethane (DCM), and adding a mixture of 20 g of chloromethyl ether and 1.5 g of anhydrous zinc chloride dropwise to obtain chloromethylated polysulfone (CMPSF); dissolving 10 g of the CMPSF in DMF, and adding 200 mL of a mixed solution of phthalimide, sodium hydride, and DMF (in a ratio of 18 g:8 g:74 mL); heating a resulting mixture at 80° C. and condensing to allow a reaction to occur under reflux for 10 h, and cooling a resulting reaction solution to room temperature; and precipitating a product with a methanol solution, washing the product repeatedly with distilled water to obtain a washed product, and drying the washed product in a vacuum drying oven at 60° C. for 24 h to obtain the PIPSF.

The present disclosure also provides a use of the MOFs-based composite pretreatment material for eliminating CAP interference in a detection of α-SOH in a hot pot soup base, specifically including the following steps:

(1) Plotting of an α-SOH Standard Curve:

preparing α-SOH standard solutions at different concentrations; adding the MOFs-based composite pretreatment material to water to obtain an MOFs-based composite pretreatment material solution; and mixing a volume $V_1$ of each of the α-SOH standard solutions at different concentrations with a volume $V_2$ of the MOFs-based composite pretreatment material solution (an α-SOH standard solution of one concentration corresponds to an MOFs-based composite pretreatment material solution), incubating resulting mixed solutions at room temperature, separating resulting mixtures by a magnet, and dissolving each of the resulting mixtures in water to obtain pretreated α-SOH standard solutions at different concentrations; mixing a volume $V_4$ of a gold-silver core-shell nanomaterial as an SERS substrate with a volume $V_3$ of each of the pretreated α-SOH standard solutions to obtain a mixed solution, adding the mixed solution dropwise to a silicon wafer, drying the silicon wafer, and subjecting the silicon wafer to spectral scanning with a portable Raman spectrometer to obtain a Raman spectrum; and setting a characteristic Raman shift as a quantification reference peak, recording an intensity value I of a characteristic peak, and establishing the α-SOH standard curve according to a relationship between an α-SOH concentration and a peak value at the characteristic Raman shift;

(2) Detection of a Sample to be Tested by Raman Spectroscopy:

weighing a mass m of a spicy hot pot soup base sample to be tested, adding a volume $V_0$ of ethanol to obtain a mixture, and subjecting the mixture to extraction in an ultrasonic instrument to obtain a crude extract solution; centrifuging the crude extract solution to obtain a supernatant, concentrating the supernatant by a rotary evaporator to obtain a concentrate, diluting the concentrate with ethanol to obtain a solution to be tested, and storing the solution to be tested at a low temperature for later use; mixing a volume $V_1$ of the solution to be tested with a volume $V_2$ of the MOFs-based composite pretreatment material solution, incubating a resulting mixed solution at room temperature, separating a solid mixture by a magnet, and dissolving the solid mixture in water to obtain a pretreated solution to be tested; mixing a volume $V_4$ of the gold-silver core-shell nanomaterial as the SERS substrate with a volume $V_3$ of the pretreated solution to be tested, adding a resulting mixed solution dropwise to a silicon wafer, drying the silicon wafer, and subjecting the silicon wafer to spectral scanning with a portable Raman spectrometer; and subjecting a resulting spectrum to baseline optimization to obtain a Raman spectrum; and (3) Quantitative Determination:

according to the Raman spectrum of the solution to be tested obtained in the step (2), setting a characteristic Raman shift as a quantification reference peak, and recording an intensity value of the quantification reference peak; and based on a concentration c of the α-SOH in the solution to be tested obtained according to the α-SOH standard curve in the step (1), further calculating a content X of the α-SOH in the spicy hot pot soup base sample according to the following formula:

$$X = \frac{c \times V_0}{m}$$

where X represents the content of the α-SOH in the spicy hot pot soup base sample, mg/g;

c represents the concentration of the α-SOH in the solution to be tested obtained according to the α-SOH standard curve, mg/mL;

$V_0$ represents the volume of the solution to be tested, mL; and m represents the mass of the spicy hot pot soup base sample, g.

Further, in the step (1), the MOFs-based composite pretreatment material solution has a concentration of 0.1 g/mL to 10 g/mL; the α-SOH standard solutions include ethanol as a solvent and have a concentration range of 0.1 mg/mL to 10 mg/mL; the gold-silver core-shell nanomaterial has a concentration of 0.1 nM to 0.5 nM; $V_1$, $V_2$, $V_3$, and $V_4$ are in a volume ratio of 1:(1-3):1:1; and the pretreated α-SOH standard solutions at different concentrations have a concentration range of 0.1 g/mL to 10 g/mL.

Further, in the step (1), 1 μL to 10 μL of the mixed solution is added dropwise to the silicon wafer; the incubation at room temperature is conducted for 1 min to 10 min; the quantification reference peak appears at 1.630 cm$^{-1}$, and is generated due to vibration of an unsaturated fat chain; and parameters of the portable Raman spectrometer are as follows: an emitted laser wavelength: 735 nm, a fixed laser power: 5 mW, a scanning range: 500 cm$^{-1}$ to 2,500 cm$^{-1}$, an integration time: 1 s to 10 s, and a number of scans: 10 scans per sample and taking an average.

Further, in the step (1), the gold-silver core-shell nanomaterial is synthesized specifically through the following steps:
  a. preparation of a gold nanorod colloid: in a thermostatic water bath at 25° C. to 30° C. adding 0.6 mL of sodium borohydride (NaBH$_4$) to 10 mL of a mixed solution including chloroauric acid (HAuCl$_4$, 0.25 mM) and 0.725 g of cetyltrimethylammonium bromide (CTAB), and stirring a resulting mixed solution for 2 min and incubating the mixed solution for 2 h in the dark to obtain a tea-brown seed solution; thoroughly mixing 5 mL of CTAB (0.2 M) and 0.07 mL of silver nitrate (AgNO$_3$, 2 mM to 6 mM), adding 5 mL of HAuCl$_4$ (1 mM), thoroughly mixing a resulting mixture to obtain a golden-yellow solution, and adding 0.012 mL of ascorbic acid (0.0788 M) to the golden-yellow solution under stirring to obtain a colorless homogeneous solution, which is a gold nanorod-growing solution; adding the tea-brown seed solution prepared above to the gold nanorod-growing solution, and storing a resulting mixed solution at room temperature in the dark for 12 h to obtain a dark-blue solution; and centrifuging the dark-blue solution at 8.000 rpm/min for 5 min to 10 min. removing a resulting supernatant, ultrasonically washing a resulting precipitate with ultrapure water (UPW) to remove an excess of the CTAB to obtain a washed precipitate, and dispersing the washed precipitate in 10 mL of UPW to obtain the gold nanorod colloid; and
  b. preparation of the gold-silver core-shell nanomaterial: thoroughly mixing 2 mL of the gold nanorod colloid prepared in step a with 4 mL of cetyltrimethylammonium chloride (CTAC, 20 mM), and stirring a resulting mixture at 60° C. for 20 min; sequentially adding 5 mL of AgNO$_3$ (1 mM to 5 mM) and 5 mL of a mixed solution including CTAC (40 mM) and ascorbic acid (0.05 M) sequentially, and heating and stirring for 4 h to obtain a gray-green solution; cooling the gray-green solution in ice water to obtain a cooled gray-green solution, centrifuging the cooled gray-green solution at 3,000 rpm/min to 6,000 rpm/min for 5 min to 10 min, and removing a resulting supernatant; and ultrasonically washing a resulting precipitate with UPW to obtain a washed precipitate, and dispersing the washed precipitate in water to obtain the gold-silver core-shell nanomaterial with a concentration of 0.1 nM to 0.5 nM.

Further, in the step (2), a ratio of the mass m of the spicy hot pot soup base sample to the volume $V_0$ of the ethanol is (10-20) g:(20-60) mL; $V_1$, $V_2$, $V_3$, and $V_4$ are in a volume ratio of 1:(1-3):1:1; and 1 μL to 10 μL of the mixed solution is added dropwise to the silicon wafer.

Further, in the step (2), the extraction is conducted for 5 min to 20 min; the crude extract solution is centrifuged at 1.000 rpm/min to 3,000 rpm/min for 3 min to 10 min; the solution to be tested is stored at −4° C.; the incubation at room temperature is conducted for 1 min to 10 min; and parameters of the portable Raman spectrometer are as follows: an emitted laser wavelength: 735 nm, a fixed laser power: 5 mW, a scanning range: 500 cm$^{-1}$ to 2,500 cm$^{-1}$, an integration time: 1 s to 10 s, and a number of scans: 10 scans per sample and taking an average.

Compared with the prior art, the present disclosure has the following advantages and beneficial effects.
  (1) In the present disclosure, an MOFs-based composite pretreatment material is prepared to effectively eliminate the interference of CAP in a spicy hot pot soup base to a Raman detection signal of α-SOH.
  (2) Compared with the existing method of using a natural enzyme to decompose CAP in a food matrix, the MOFs-based composite pretreatment material prepared by the present disclosure has high stability and a wide temperature application range, which provides a reliable guarantee for the real-time and on-site detection of a numbing substance in actual production.

DETAILED DESCRIPTION OF THE EMBODIMENTS

Figure 1:
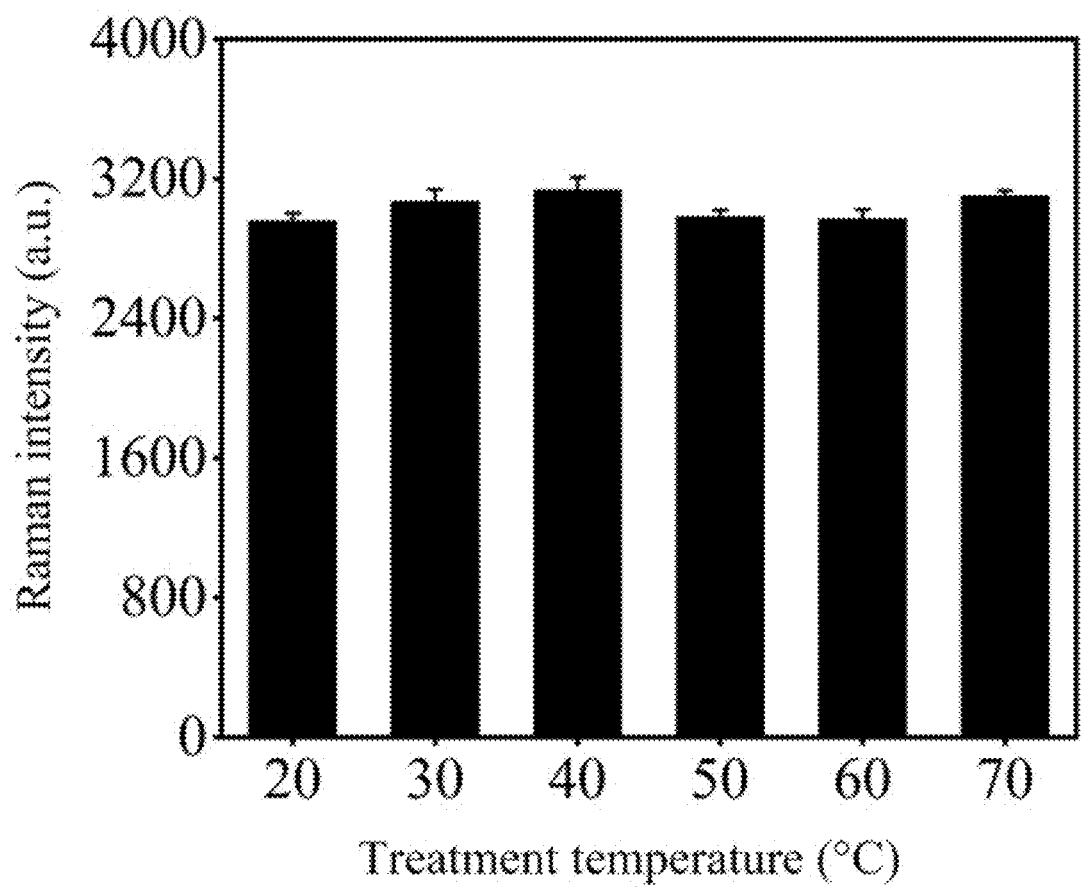
FIG. 1 shows results of a stability test of the MOFs-based composite pretreatment material prepared in Example 1.
Figure 2:
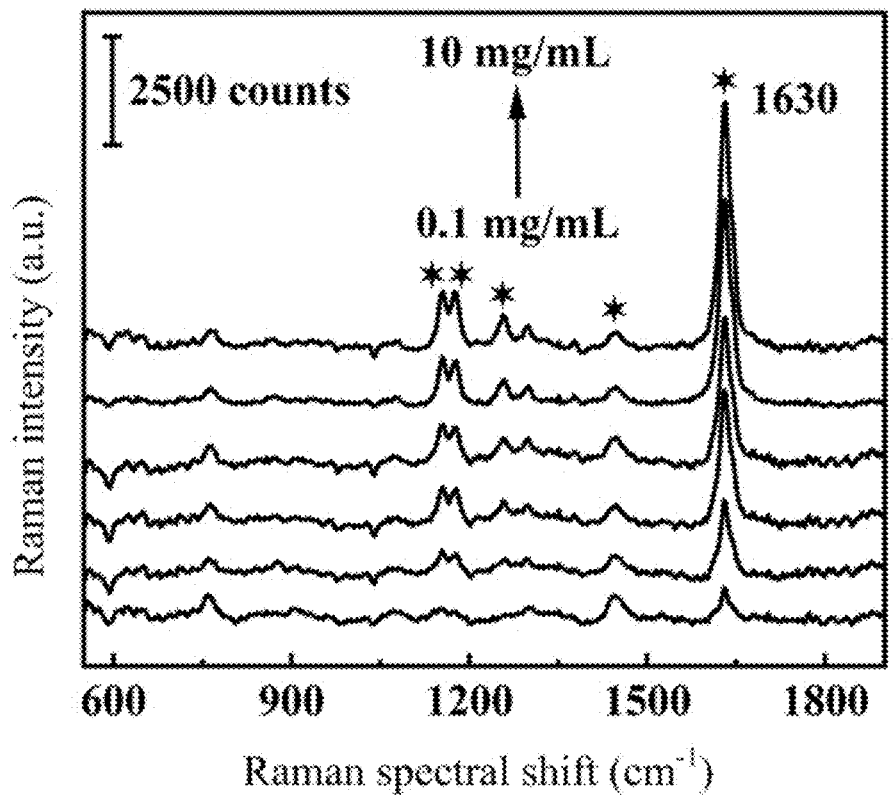
FIG. 2 shows SERS spectra of detection of α-SOH standard solutions with a concentration range of 0.1 mg/mL to 10 mg/mL.
Figure 3:
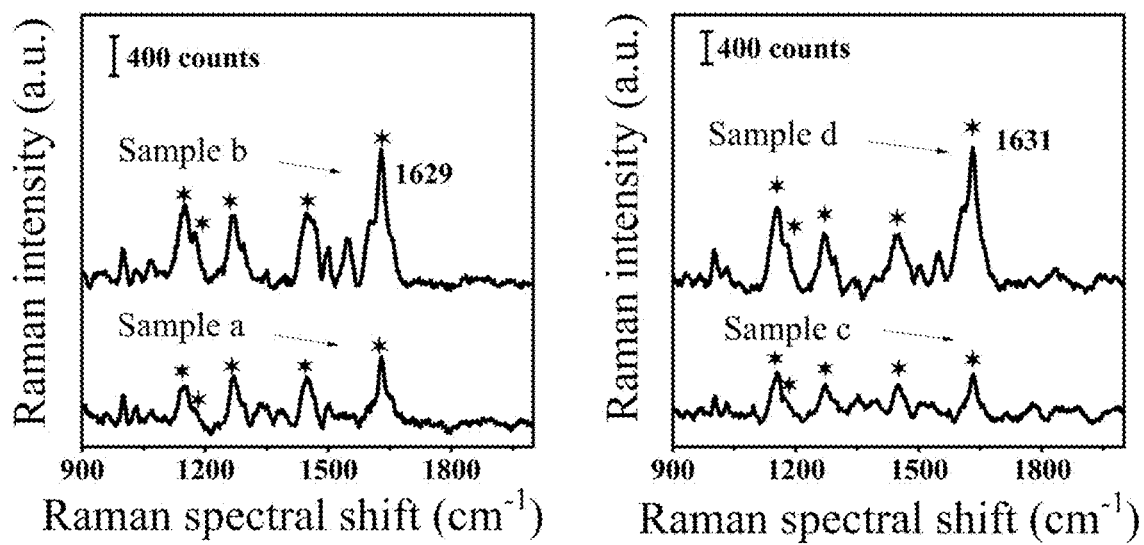
FIG. 3 shows Raman spectra of numbing substances in two spicy hot pot soup base samples and Raman spectra of numbing substances in two spicy hot pot soup base samples treated with the MOFs-based composite pretreatment material, where a sample a is a Haidilao spicy hot pot soup base, a sample b is a pretreated solution of the Haidilao spicy hot pot soup base to be tested, a sample c is a Xiabu Xiabu spicy hot pot soup base, and a sample d is a pretreated solution of the Xiabu Xiabu spicy hot pot soup base to be tested.

In order to illustrate the content of the present disclosure clearly, the present disclosure is described in detail below in conjunction with examples, but the present disclosure is not limited to these examples.

Example 1

1. Experimental Samples and Main Reagents and Instruments

Samples: 6 different spicy hot pot soup bases purchased from the market were used as test objects; sample 1: Hong Jiujiu, sample 2: Haidilao, sample 3: Qiao Tou, sample 4: Hot Space, sample 5: Da Hong Pao, and sample 6: Xiabu Xiabu.

α-SOH standards: These standards were purchased from Chengdu Refmedic Technology Co., Ltd. and had a purity of higher than or equal to 98%.

Membrane material: PSF purchased from Tianjin Motimo Membrane Technology Co., Ltd. was used as an original membrane material.

Reagents: Water used in an experimental process was deionized water, and experimental reagents used were analytically pure.

Instrument: Portable Raman spectrometer (SR-510 Pro, Weihai Optical Instrument (Shanghai) Co., Ltd.).

2. Preparation of an MOFs-Based Composite Pretreatment Material
(1) In this step, a mixture of HKUST-1 and ZIF-8 (ZIF-8/HKUST-1) was adopted as an MOFs material, and the MOFs material was prepared specifically as follows:

0.1 g of polyvinylpyrrolidone (PVP) was added to 40 mL of a $CuCl_2$ (2.5 mM) solution, and the resulting mixture was thoroughly stirred; then 2.5 mL of a NaOH solution (0.2 M) was slowly added, and the resulting mixture was stored at room temperature for 5 min; and then 2.5 mL of an ascorbic acid solution (0.1 M) was added dropwise, the resulting mixture was further stored at room temperature for 5 min and then added to a mixed solution of a PVP solution (0.4 g. 60 mL) and a solution of trimesic acid in methanol (0.2 g. 4 mL), and the resulting mixture was continuously stirred at room temperature for 16 h to obtain HKUST-1.

5 mL of HKUST-1 was diluted with methanol to 50 mL, a solution of PVP in methanol (PVP: 350 mg, methanol: 10 mL) was added, and the resulting mixture was stirred at room temperature for 12 h to obtain a PVP/HKUST-1 suspension; 0.5 mL of the PVP/HKUST-1 suspension and 0.372 g of $Zn(NO_3)_2 \cdot 6H_2O$ were dispersed in 50 mL of methanol, then 50 mL of a solution of 0.103 g of 2-methylimidazole in methanol was added, and a reaction was conducted at room temperature for 24 h; and the resulting reaction system was centrifuged at 3,000 rpm/min for 10 min, and a product in a lower layer was collected to obtain ZIF-8/HKUST-1.

ZIF-8/HKUST-1 was added to 100 mL of methanol, ultrasonically washed for 3 min. and then centrifuged at 3,000 rpm/min for 10 min, and the resulting solid material was collected, dried in an oven at 45° C. for 8 h, and dispersed in methanol to obtain a ZIF-8/HKUST-1 suspension with a concentration of 0.8 mg/mL.

(2) In this step, a mixture of ferrous chloride tetrahydrate ($FeCl_2 \cdot 4H_2O$) and ferric chloride hexahydrate ($FeCl_3 \cdot 6H_2O$) was adopted as an iron salt, and the iron salt was used for the following specific operation:

0.438 g of $FeCl_2 \cdot 4H_2O$ and 1.192 g of $FeCl_3 \cdot 6H_2O$ were dissolved in 40 mL of deoxygenated pure water, and the resulting solution was stirred at 35° C. to obtain an iron salt solution; 8 mL of ammonia water with a concentration of 28% was added dropwise to the iron salt solution, and the resulting mixed solution was further stirred for 2 h to obtain a dispersion; the dispersion was centrifuged at 15,000 rpm/min for 30 min to obtain a precipitate, and the precipitate was washed with water and separated through centrifugation, which was repeated three times; and the resulting precipitate was dispersed in water to obtain a ferroferric oxide ($Fe_3O_4$) nanoparticle suspension in which a concentration of $Fe_3O_4$ nanoparticles was 20 mg/mL.

(3) 40 mL of the $Fe_3O_4$ nanoparticle suspension was added to 10 mL of the ZIF-8/HKUST-1 suspension, and the resulting mixed solution was heated at 80° C. for 12 h to obtain a solid suspension; the solid suspension was centrifuged at 6,000 rpm/min for 10 min, and the resulting precipitate was ultrasonically washed with water for 3 min and then separated through centrifugation, which was repeated three times; and the resulting product was collected, dried at 25° C. for 24 h, and then dispersed in DMF to obtain a $Fe_3O_4$-modified ZIF-8/HKUST-1 ($Fe_3O_4$/ZIF-8/HKUST-1) suspension in which a concentration of $Fe_3O_4$/ZIF-8/HKUST-1 was 16 mg/mL.

(4) 20 g of PIPSF was dissolved in 100 mL of DMF to obtain a PIPSF solution, 100 mL of the $Fe_3O_4$/ZIF-8/HKUST-1 suspension was added, and the resulting mixture was stirred at room temperature to obtain an MOFs-based composite material stock solution; the MOFs-based composite material stock solution was prepared by a semi-continuous spray gun device with a nozzle size of 800 μm into a droplet, the droplet was solidified and precipitated in water, and the resulting spheroid precipitate was filtered out by a 5 μm nylon filter to obtain the MOFs-based composite pretreatment material, which was denoted as PIPSF/$Fe_3O_4$/ZIF-8/HKUST-1.

The PIPSF was synthesized specifically through the following steps: 20 g of PSF was dissolved in 200 mL of DCM, and a mixture of 20 g of chloromethyl ether and 1.5 g of anhydrous zinc chloride was added dropwise to obtain CMPSF; 10 g of the CMPSF was dissolved in DMF, and 200 mL of a mixed solution of phthalimide, sodium hydride, and DMF (in a ratio of 18 g:8 g:74 mL) was slowly added; the resulting mixture was heated at 80° C. and condensed to allow a reaction to occur under reflux for 10 h, and the resulting reaction solution was cooled to room temperature; and a product was precipitated with a methanol solution, washed repeatedly with water, and dried in a vacuum drying oven at 60° C. for 24 h to obtain the PIPSF.

A use of the MOFs-based composite pretreatment material for eliminating CAP interference in detection of α-SOH in a hot pot soup base was provided, specifically including the following steps:

(1) Plotting of an α-SOH Standard Curve

The PIPSF/$Fe_3O_4$/ZIF-8/HKUST-1 for eliminating CAP interference prepared by the above method was adopted.

α-SOH standard solutions at different concentrations were prepared specifically through the following steps: 10 mg of α-SOH was weighed and added to a 5 mL centrifuge tube, 1 mL of ethanol was added, and the resulting mixture was ultrasonically treated for thorough dissolution to obtain a standard stock solution; and different volumes of the standard stock solution were taken and diluted with ethanol to obtain a series of α-SOH standard solutions at different concentrations (0.1 mg/mL, 0.5 mg/mL, 1 mg/mL, 2 mg/mL. 3 mg/mL, 6 mg/mL, and 10 mg/mL), and the α-SOH standard solutions at different concentrations were stored at −4° C.

Then 10 mg of PIPSF/$Fe_3O_4$/ZIF-8/HKUST-1 was added to water to obtain a PIPSF/$Fe_3O_4$/ZIF-8/HKUST-1 solution.

10 μL of each of the α-SOH standard solutions at different concentrations was taken and mixed with 10 μL of the PIPSF/$Fe_3O_4$/ZIF-8/HKUST-1 solution, the resulting mixed solutions were incubated at room temperature for 1 min, and the resulting solid mixtures were adsorbed and separated by a magnet and then dissolved in water to obtain pretreated α-SOH standard solutions at different concentrations each of 10 μL. 10 μL of a gold-silver core-shell nanomaterial was taken as an SERS substrate and mixed with 10 μL of each of the pretreated α-SOH standard solutions at different concentrations, then 10 μL of the resulting mixed solution was taken and added dropwise to a silicon wafer, and the silicon wafer was dried and subjected to spectral scanning with a portable Raman spectrometer to obtain a Raman spectrum in a range of 500 $cm^{-1}$ to 2,500 $cm^{-1}$, where parameters of the portable Raman spectrometer were as follows: emitted laser wavelength: 735 nm, fixed laser power: 5 mW, integration time: 4 s, and number of scans: 10 scans per sample and taking an average; and a characteristic Raman shift at 1,630 $cm^{-1}$ was set as a quantification reference peak, a peak intensity value was recorded, and an α-SOH standard curve was plotted according to a relationship between an α-SOH concentration and a peak value at the characteristic Raman shift.

The gold-silver core-shell nanomaterial was synthesized specifically through the following steps: (a) Preparation of a gold nanorod colloid: In a thermostatic water bath at 25° C., a low-temperature $NaBH_4$ solution (0.6 mL, 10 mM) was added to 10 mL of a mixed solution including $HAuCl_4$ (0.25 mM) and CTAB (0.1 M), and the resulting mixed solution was stirred for 2 min and incubated for 2 h to obtain a tea-brown seed solution; CTAB (5 mL, 0.2 M), $AgNO_3$ (0.15 mL, 4 mM), and $HAuCl_4$ (5 mL, 1 mM) were thoroughly mixed to obtain a golden-yellow solution, then ascorbic acid (0.07 mL, 0.0788 M) was slowly added under stirring, and the resulting mixture was thoroughly mixed to obtain a colorless solution, which was a gold nanorod-growing solution; 0.012 mL of the tea-brown seed solution freshly prepared above was added to the gold nanorod-growing solution, and the resulting mixed solution was stored at room temperature in the dark for 12 h to obtain a dark-blue solution; and the dark-blue solution was centrifuged at 8,000 rpm/min for 10 min, the resulting supernatant was removed, 20 mL of water was added to the resulting precipitate and the resulting suspension was centrifuged to remove an excess of the CTAB to obtain a washed precipitate, and the washed precipitate was dispersed in 20 mL of water to obtain the gold nanorod colloid. (b) Preparation of the gold-silver core-shell nanomaterial: 2 mL of the gold nanorod colloid and 4 mL of CTAC (20 mM) were mixed and stirred at 60° C. for 20 min; then 5 mL of $AgNO_3$ (2 mM) and 5 mL of a mixed solution including CTAC (40 mM) and ascorbic acid (0.05 M) were added sequentially, and the resulting mixture was further stirred at 60° C. for 4 h to obtain a gray-green solution; and the gray-green solution was cooled in ice water and then centrifuged at 4,000 rpm/min for 10 min, and the resulting precipitate was washed and dispersed in water to obtain the gold-silver core-shell nanomaterial with a concentration of 0.18 nM.

(2) Detection of a Solution to be Tested by Raman Spectroscopy 20 g of a spicy hot pot soup base sample to be tested was weighed and added to 40 mL of ethanol, and the resulting mixture was subjected to extraction in an ultrasonic instrument to obtain a crude extract solution; the crude extract solution was centrifuged at 3,000 rpm/min for 10 min, the resulting supernatant was collected, concentrated by a rotary evaporator, and then diluted with ethanol to obtain 4 mL of a solution to be tested, and the solution to be tested was stored at −4° C. for later use. 10 μL of the solution to be tested was taken and mixed with 10 μL of the $PIPSF/Fe_3O_4/ZIF-8/HKUST-1$ solution, the resulting mixed solution was incubated at room temperature for 1 min, and the resulting solid mixture was separated by a magnet and then dissolved in water to obtain 10 μL of a pretreated sample solution to be tested.

10 μL of a gold-silver core-shell nanomaterial was taken as an SERS substrate and mixed with 10 μL of the pretreated sample solution to be tested, 10 μL of the resulting mixed solution was taken and added dropwise to a silicon wafer, and the silicon wafer was dried and then subjected to spectral scanning with a portable Raman spectrometer in a range of 500 $cm^{-1}$ to 2,500 $cm^{-1}$, where parameters of the portable Raman spectrometer were as follows: emitted laser wavelength: 735 nm, fixed laser power: 5 mW, integration time: 4 s, and number of scans: 10 scans per sample and taking an average; and the resulting spectrum was subjected to baseline optimization to obtain a Raman spectrum.

(3) Quantitative Determination

According to the Raman spectrum of the solution to be tested obtained in the step (2), a characteristic Raman shift at 1,630 $cm^{-1}$ was set as a quantification reference peak, and an intensity value of the quantification reference peak was recorded; and based on a concentration c of α-SOH in the solution to be tested obtained according to the α-SOH standard curve in the step (1), a content X of α-SOH in the spicy hot pot soup base sample was further calculated according to the following formula:

$$X = \frac{c \times V_0}{m}$$

where X represents the content of α-SOH in the spicy hot pot soup base sample, mg/g;
c represents the concentration of α-SOH in the solution to be tested obtained according to the α-SOH standard curve, mg/mL;
$V_0$ represents a volume of the solution to be tested, mL; and
m represents a mass of the spicy hot pot soup base sample, g.

6. Verification Experiment

Six spicy hot pot soup base sample solutions to be tested were tested by HPLC, and an α-SOH content in each of the spicy hot pot soup base samples was calculated to verify the accuracy of determination results of the method of the present disclosure. α-SOH was detected by HPLC, and with a peak at a retention time of 16.2 min to 16.6 min as a target peak, an α-SOH standard curve of a relationship between an α-SOH concentration and a peak area was plotted. Then 2 mL of a sample solution to be tested was taken, filtered through a 0.22 μm organic filter membrane, and then tested by HPLC, an α-SOH concentration in the sample solution to be tested was calculated according to a target peak area and the standard curve, and then the α-SOH concentration was converted into an α-SOH content in a spicy hot pot soup base sample according to the formula in the step 5. α-SOH contents determined by Raman spectroscopy and HPLC were shown in Table 1, and a relative error between a concentration detected by HPLC and a concentration detected by Raman spectroscopy for different spicy hot pot soup base samples was lower than 10%. The results show that an α-SOH content in a spicy hot pot soup base sample can be effectively determined by the method for detecting a numbing substance in the present disclosure, with a reliable detection result.

TABLE 1

Comparison of detection results of HPLC and Raman spectroscopy

| Hot pot soup base sample No. | Concentration detected by HPLC (mg/g) | Concentration detected by Raman spectroscopy (mg/g) | Relative error (%) |
|---|---|---|---|
| 1 | 0.14 | 0.15 | 7.1 |
| 2 | 0.47 | 0.48 | 2.1 |
| 3 | 0.58 | 0.56 | 3.4 |
| 4 | 1.35 | 1.34 | 0.7 |
| 5 | 0.134 | 0.13 | 3.0 |
| 6 | 0.09 | 0.09 | 0 |

What is claimed is:

1. A preparation method of a metal-organic frameworks (MOFs)-based composite pretreatment material for eliminating capsaicin (CAP) interference, wherein steps are as follows:
   (1) adding an MOFs material to methanol, performing ultrasonic washing, after the washing, collecting a resulting solid material through centrifugation, drying the resulting solid material to obtain a dried solid material, and redispersing the dried solid material in methanol to obtain an metal-organic frameworks suspension, which is denoted as a suspension A;
   (2) dissolving an iron salt in deoxygenated pure water, stirring to obtain an iron salt solution; adding ammonia water dropwise to the iron salt solution, and after the adding is completed, further stirring to obtain a dispersion; the dispersion is subjected to centrifugation to obtain a precipitate, after washing and centrifugation, and dispersing the precipitate in water to obtain a magnetic nanoparticle suspension, which is denoted as a suspension B;
   (3) adding the suspension A to the suspension B, and heating a resulting mixed solution to obtain a solid suspension; after subjecting the solid suspension to centrifugation and ultrasonic washing, collecting a product; followed by drying the product and obtaining a dried product after the drying, and dispersing the dried product in N,N-dimethylformamide (DMF) to obtain a magnetic material-modified metal-organic frameworks suspension, which is denoted as a suspension C; and
   (4) first, dissolving amidated polysulfone (PIPSF) in N,N-dimethylformamide (DMF) to obtain a PIPSF solution; adding the suspension C to mix, stirring at room temperature to obtain an MOFs-based composite material stock solution; generating droplets from the MOFs-based composite material stock solution by a spray gun device, solidifying and precipitating the droplet in water, and obtaining a spheroid precipitate after filtering, which is the MOFs-based composite pretreatment material.

2. The preparation method of the MOFs-based composite pretreatment material for eliminating CAP interference according to claim 1, wherein in the step (1), the MOFs material is one or a mixture of more selected from the group consisting of HKUST-1, ZIF-67, ZIF-8, Fe-BTC, and MIL-101 (Fe); a particle size of the MOFs material is 0.1 μm to 5 μm; and
   a time for the ultrasonic washing is 1 min to 3 min; a condition for the centrifugation is 3,000 rpm/min to 8,000 rpm/min for 5 min to 10 min; a condition for the drying is 30° C. to 60° C. for 6 h to 12 h; and a concentration range of the suspension A is 0.1 mg/mL to 10 mg/mL.

3. The preparation method of the MOFs-based composite pretreatment material for eliminating CAP interference according to claim 1, wherein in the step (2), the iron salt is one or a mixture of two selected from the group consisting of ferrous chloride tetrahydrate and ferric chloride hexahydrate; a concentration of the ammonia water is 20% to 30%; a use ratio of the iron salt, the deoxygenated pure water, the ammonia water, and the water is (1-2) g:(40-50) mL:(5-10) mL:(40-50) mL; and a concentration range of the suspension B is 10 mg/mL to 30 mg/mL.

4. The preparation method of the MOFs-based composite pretreatment material for eliminating CAP interference according to claim 1, wherein in the step (2), a condition for the stirring to obtain the iron salt solution is 35° C.; a time for the further stirring to obtain the dispersion is 2 h to 3 h; a condition for the centrifugation is each 15,000 rpm/min for 10 min to 30 min; and a condition for the washing is: adding the precipitate to water for washing.

5. The preparation method of the MOFs-based composite pretreatment material for eliminating CAP interference according to claim 1, wherein in the step (3), a use ratio of the suspension A to the suspension B is (30-40) mL:(10-20) mL; a concentration range of the suspension C is 10 mg/mL to 20 mg/mL; and
   a temperature for the heating is 50° C. to 100° C. with a time of 10 h to 20 h; a condition for the centrifugation is: a rotation speed of 3,000 r/min to 6,000 r/min and a time of 10 min to 15 min; an operation for the ultrasonic washing is: adding a precipitate obtained after the centrifugation to water and conducting ultrasonic washing; and a condition of the drying is: 25° C. for 24 h.

6. The preparation method of the MOFs-based composite pretreatment material for eliminating CAP interference according to claim 1, wherein in the step (4), a use ratio of the amidated polysulfone to the N, N-dimethylformamide (DMF) is (10-20) g:100 mL; a volume ratio of the PIPSF solution to the suspension C is (1-5):(1-10); a time for the stirring at room temperature is 12 h to 24 h; a condition for generating the droplets from the MOFs-based composite material stock solution is: generating the droplets specifically by a semi-continuous spray gun device with a nozzle size of 800 μm; and an operation for obtaining the spheroid precipitate is: filtering with a 5 μm nylon filter.

7. A use of an MOFs-based composite pretreatment material prepared by the preparation method according to claim 1 in a detection of hydroxy-α-sanshool (α-SOH) in a hot pot soup base, wherein steps are as follows:
   (1) plotting of an α-SOH standard curve:
   first, preparing α-SOH standard solutions at different concentrations; followed by adding the prepared MOFs-based composite pretreatment material to water to obtain an MOFs-based composite pretreatment material solution; and
   mixing a volume $V_1$ of each of the α-SOH standard solutions at different concentrations with a volume $V_2$ of the MOFs-based composite pretreatment material solution, after the mixing, subjecting resulting mixed solutions to incubation at room temperature, separating resulting mixtures by a magnet after the incubation, and redissolving each of the resulting mixtures in water to obtain pretreated α-SOH standard solutions at different concentrations; finally mixing a volume $V_4$ of a gold-silver core-shell nanomaterial as a surface-enhanced Raman spectroscopy (SERS) substrate with a volume $V_3$ of each of the pretreated α-SOH standard solutions to obtain a mixed solution, adding the mixed solution dropwise to a silicon wafer, after drying the silicon wafer, subjecting the silicon wafer to spectral scanning with a portable Raman spectrometer to obtain a Raman spectrum; setting a characteristic Raman shift as a quantification reference peak, recording an intensity value I of a characteristic peak, and establishing the α-SOH standard curve according to a relationship between an α-SOH concentration and a peak value at the characteristic Raman shift;

(2) detection of a sample to be tested by Raman spectroscopy:

weighing a mass, denoted as m of a spicy hot pot soup base sample to be tested, adding a volume $V_0$ of ethanol to obtain a mixture, and subjecting the mixture to extraction in an ultrasonic instrument to obtain a crude extract solution; the crude extract solution is subjected to centrifugation followed by collecting a supernatant, concentrating the supernatant by a rotary evaporator, diluting a resulting concentrate with ethanol to obtain a solution to be tested, and subjecting the solution to be tested to a low temperature storage for later use; mixing a volume $V_1$ of the solution to be tested with a volume $V_2$ of the MOFs-based composite pretreatment material solution, subjecting a resulting mixed solution to incubation at room temperature, separating a solid mixture by a magnet after the incubation, and redissolving the solid mixture in water to obtain a pretreated solution to be tested; finally mixing a volume $V_4$ of the gold-silver core-shell nanomaterial as the SERS substrate with a volume $V_3$ of the pretreated solution to be tested, adding the resulting mixed solution dropwise to a silicon wafer, after drying the silicon wafer, subjecting the silicon wafer to spectral scanning with a portable Raman spectrometer; and subjecting a resulting spectrum to baseline optimization to obtain a Raman spectrum; and (3) quantitative determination:

according to the Raman spectrum of the solution to be tested obtained in the step (2), setting a characteristic Raman shift as a quantification reference peak, recording an intensity value of the quantification reference peak; and based on a concentration, denoted as c of the α-SOH in the solution to be tested obtained according to the α-SOH standard curve in the step (1), further calculating a content X of the α-SOH in the spicy hot pot soup base sample according to the following formula:

$$X = \frac{c \times V_0}{m}$$

wherein X represents the content of the α-SOH in the spicy hot pot soup base sample, mg/g;

c represents the concentration of the α-SOH in the solution to be tested obtained according to the α-SOH standard curve, mg/mL;

$V_0$ represents the volume of the solution to be tested, mL; and m represents the mass of the spicy hot pot soup base sample, g.

8. The use according to claim 7, characterized in that, wherein in the step (1), a concentration of the MOFs-based composite pretreatment material solution is 0.1 g/mL to 10 g/mL; the α-SOH standard solutions comprise ethanol as a solvent and having a concentration range of 0.1 mg/mL to 10 mg/mL; a concentration of the gold-silver core-shell nanomaterial is 0.1 nM to 0.5 nM; a volume ratio of $V_1$, $V_2$, $V_3$, and $V_4$ is: 1:(1-3):1:1; and collected solids are redissolved in water to obtain the pretreated α-SOH standard solutions at different concentrations having a concentration range of 0.1 g/mL to 10 g/mL.

9. The use according to claim 7, wherein in the step (1), a use amount added dropwise to the silicon wafer is 1 μL to 10 μL; a time for the incubation at room temperature is 1 min to 10 min; the quantification reference peak appears at 1,630 $cm^{-1}$, and is generated due to vibration of an unsaturated fat chain; and parameters of the portable Raman spectrometer are as follows: an emitted laser wavelength of the portable Raman spectrometer is 735 nm, a fixed laser power is 5 mW, a scanning range is 500 $cm^{-1}$ to 2,500 $cm^{-1}$, an integration time is 1 s to 10 s, and scanning each samples for 10 times and taking an average value.

10. The use according to claim 7, wherein in the step (2), a use ratio of the mass m of the spicy hot pot soup base sample to the volume $V_0$ of the ethanol is (10-20) g:(20-60) mL; a volume ratio of $V_1$, $V_2$, $V_3$, and $V_4$ is 1:(1-3):1:1; and a use amount added dropwise to the silicon wafer is 1 μL to 10 μL; and a time for the extraction is 5 min to 20 min; a condition for the centrifugation of the crude extract solution is 1,000 rpm/min to 3,000 rpm/min with a time of 3 min to 10 min; a condition for the low temperature storage is −4° C.; a time for the incubation at room temperature is 1 min to 10 min; and parameters of the portable Raman spectrometer are as follows: an emitted laser wavelength of the portable Raman spectrometer is 735 nm, a fixed laser power is 5 mW, a scanning range is 500 $cm^{-1}$ to 2,500 $cm^{-1}$, an integration time is 1 s to 10 s, and scanning each samples for 10 times and taking an average value.

* * * * *